United States Patent
Adam et al.

(10) Patent No.: US 10,975,342 B2
(45) Date of Patent: Apr. 13, 2021

(54) PROCESS FOR PREPARING A FERMENTED BEVERAGE

(76) Inventors: Pierre Adam, Walhain (BE); Bart Vanderhaegen, Kessel-Lo (BE)

( * ) Notice: Subject to any disclaimer, the term of this patent is extended or adjusted under 35 U.S.C. 154(b) by 1309 days.

(21) Appl. No.: 12/734,356

(22) PCT Filed: Oct. 29, 2008

(86) PCT No.: PCT/EP2008/064627
§ 371 (c)(1),
(2), (4) Date: May 23, 2011

(87) PCT Pub. No.: WO2009/056554
PCT Pub. Date: May 7, 2009

(65) Prior Publication Data
US 2011/0236528 A1    Sep. 29, 2011

(30) Foreign Application Priority Data
Oct. 29, 2007 (EP) ..................................... 07119465

(51) Int. Cl.
*C12C 3/12* (2006.01)
*C12C 7/20* (2006.01)
*C12C 7/24* (2006.01)

(52) U.S. Cl.
CPC ............... *C12C 3/12* (2013.01); *C12C 7/205* (2013.01); *C12C 7/24* (2013.01)

(58) Field of Classification Search
CPC ........... C12C 3/12; C12C 7/205; C12C 9/025; C12C 3/00; C12C 3/08; C12C 5/026; A23V 2250/21; A61K 2236/10
USPC .................. 426/11, 16, 600, 655; 99/278
See application file for complete search history.

(56) References Cited

U.S. PATENT DOCUMENTS

| | | | |
|---|---|---|---|
| 4,123,561 A | * | 10/1978 | Grant ........................... 426/600 |
| 4,234,516 A | | 11/1980 | Koller et al. |
| 4,338,348 A | | 7/1982 | Muller |
| 4,395,431 A | | 7/1983 | Lance et al. |
| 4,946,691 A | * | 8/1990 | Burkhardt et al. ........... 426/600 |
| 5,370,897 A | | 12/1994 | Smith et al. |

FOREIGN PATENT DOCUMENTS

| | | |
|---|---|---|
| DE | 28 33 589 A1 | 2/1980 |
| DE | 101 56 829 A1 | 5/2003 |
| EP | 0 311 330 A1 | 4/1989 |
| EP | 0 363 023 A1 | 4/1990 |
| EP | 0 474 892 A1 | 3/1992 |
| GB | 1 423 129 | 1/1976 |
| GB | 1 424 785 | 2/1976 |

OTHER PUBLICATIONS

Briggs, Dennis E. Boulton, Chris A. Brookes, Peter A. Stevens, Roger. (2004). Brewing Science and Practice—1. An Outline of Brewing. Woodhead Publishing. pp. 1-6 Online version available at: http://app.knovel.com/hotlink/pdf/id:kt003RWPQ8/brewing-science-practice/an-outline-brewing.*

* cited by examiner

*Primary Examiner* — Vera Stulii
(74) *Attorney, Agent, or Firm* — Levy & Grandinetti

(57) ABSTRACT

A process is disclosed for obtaining a minimum concentration of $20.10^{-6}$ kg/L of iso-α-acids in a liquid composition. The process includes mixing in water a natural source of α-acids and at least one metal oxide.

7 Claims, No Drawings

PROCESS FOR PREPARING A FERMENTED BEVERAGE

The Applicants claim priority to International Application Number PCT/EP2008/064627, filed on Oct. 29, 2008, which claims priority to European Application Number 07119465.8, filed on Oct. 29, 2007.

FIELD OF THE INVENTION

The present invention relates to a process for preparing a beverage during a brewing process comprising the steps of:
producing a mash,
filtration of said mash to produce a wort,
boiling of said wort,
hopping of the wort by addition of hops before or during the boiling step of
the wort, and
a fermentation of said wort to produce a fermented beverage.
The invention further relates to a process for obtaining a product having a minimum concentration of $20.10^{-6}$ kg/L of iso-α-acids.

BACKGROUND OF THE INVENTION

The brewing process for the production of a classical beer is typically done by the main following steps:
Mashing involves mixing ground malt and other ground grains with water in the presence of enzymes which degrade proteins into peptides and amino-acids and starch into fermentable sugars (e.g. glucose, maltose and maltotriose) and dextrins.
Filtration of the mash which separates liquid and solid phases, whereby the liquid phase is referred to as un-hopped wort.
Hopping of the wort whereby hops containing α-acids are added being isomerised during the wort boiling in iso-α-acids, said iso-α-acids responsible for the bitterness of the beer.
Wort boiling, in general, is used to sterilize the wort, to remove the undesirable volatile compounds and to extract and isomerise the bitterness substances of hops, and to remove, by denaturation, excess of protein. This process step occurs during 60 minutes to 90 minutes, and is essential for colloidal stability, as a well-formed hot break is thus obtained, which is a precipitable material highly detrimental to the stability of beer. Said hot break can then be removed by decantation, centrifugation or by using a whirlpool.
Prior to the fermentation process the wort is cooled to fermentation temperature, oxygenated (either with air or pure oxygen) and pitched with yeast. In the cold wort, proteins, polyphenols and carbohydrates tend to interact with each other and form sub-micron non-soluble particles, called "cold-break".
Fermentation is the conversion by yeast of fermentable carbohydrates into ethanol, carbon dioxide and other compounds, which give beer its specific character. During the fermentation stage, there is an adsorption of polyphenols and other pigment compounds onto the yeast cell surface.
The fermentation stage is generally followed by a maturation stage. During the maturation stage, the precursor of diacetyl, is converted to diacetyl, which is reduced in contact with yeast into acetoin.
After the maturation stage, beer is typically chilled to as low a temperature as possible without freezing (e.g. −2° C.). The cold-conditioning stage, also called "cold-ageing", is particularly critical to develop "chill haze". Any increase of the temperature could re-dissolve haze, and thus return haze precursors to beer, with the danger of developing the haze afterwards.
The precipitable chill haze should be removed from beer, either during beer filtration or before. This operation can be realized by a simple elimination in whole or in part of the precipitated material, what brewers call "purge", by transfer from tank to tank, and/or by centrifugation of beer. Temperature control is critical, to prevent re-dissolvation of the haze precursors.
Filtration is an important and critical operation, which should provide the visual aspect and the stability of the delivered product to the consumer. At least some of the yeast, protein, cold trub particles and carbohydrate particles must be removed from the beer to achieve the necessary clarity.
Packaging is the final step of the brewing process.
Hops have several functions during brewing. Indeed hops are responsible for the bitter taste of beer and provide aroma. Further, hops modify yeast performance during fermentation and contribute to beer texture. Moreover, hops have bactericidal properties that protect beer against some biological contamination, hops reduce foaming during wort boiling and aid in protein coagulation during the boil. (The Brewer international. Vol. 3 issued 1 Jan. 2003).

With the recently increased cost of hops and hop shortage on global market, there is a need to reduce the amount of hops that is used during the bittering process of a fermented beverage.

It is known to add some bittering agents at the end of the brewing process, at the post-fermentation stage. However, at this stage, the bittering agents should be of high purity, already converted into iso-α-acids, and are generally obtained after several purification steps that render the bittering agents ready-to-use more expensive. Moreover, the addition of bittering agents at the end of the process deprives the brewing process of the advantageous properties of hops.

It is also known to use isomerised hop pellets that are produced by milling whole hops and compressing hops into dry pellets with about 2% magnesium oxide added during the pelletising process (see EP 311330). These stabilized pellets, packed in an inert atmosphere are then heated at 50° C. for approximately 14 days, with up to 80-90% of the α-acids isomerised in situ. Preisomerized hop pellets render a high hop yield, but are also more expensive (per amount of α-acids) than regular pellets (about 20%).

Furthermore, production of these pre-isomerized pellets takes about 2 weeks due to the required storage in warm chambers and is usually performed on fresh hops shortly after harvest. Therefore, breweries have to plan and contract long time in advance the quantities they will need of this hop product.

It is also known to use preisomerised hop extract that is produced during the process for manufacturing hop extract by heating the hop extract with alkali metal carbonate while said extract is still in the resin form. Unfortunately, pre-isomerised hop extract suffers from the same drawbacks as isomerised hop pellets.

U.S. Pat. No. 4,234,516 discloses a process for the isomerisation of humulone or a humulone containing material by using a liquid medium containing at least one salt of a bi-valent metal. According to U.S. Pat. No. 4,234,516, the salt used should dissociate in solution to form an anionic part and cationic part and the liquid medium is preferably water to which an organic solvent is added. U.S. Pat. No. 4,234,516 relates to a chemical process to produce chemical isohumulone wherein taste properties (addition of salt) or comestible properties (addition of ethanol, acetone) are not critical.

U.S. Pat. No. 53,070,897 relates to a method of production of isomerised hop preparation in which a hop extract is mixed with a solubilised alkaline and an alkaline earth metal salt to effect conversion of α-acids into iso-α-acids. The addition of alkaline is needed to reach a pH in the range between 8 and 10 to optimize the conversion yield. The formed alkaline-earth-resin complex is dissociated by the addition of sulphuric or hydrochloric acid. All the cationic components of the alkaline salt should be removed from the isomerised resin extract to obtain a stable product.

The invention intends to address at least some of the above cited drawbacks by providing a process that reduces the amount of hops to be used for giving the same bitterness to the fermented beverage at low cost while keeping the same fermentation step and equipment.

SUMMARY OF THE INVENTION

To this end, the invention provides a process for obtaining a minimum concentration of $20.10^{-6}$ kg/L of iso-α-acids in a liquid composition is presented, said process being characterized by mixing in water a natural source of α-acids and a metal oxide.

The invention further provides a process for preparing a fermented beverage comprising the steps of producing a mash; filtering said mash and recovering the wort; boiling said wort; and fermenting said wort to produce a fermented beverage, wherein a liquid composition comprising iso-α-acids is added to said wort or said fermented beverage and in that said bittering composition is prepared prior to its addition—to the wort or the fermented beverage—by mixing in water at least one metal oxide with a natural source of α-acids. Preferably, the liquid composition is be prepared in situ prior to the addition of the liquid composition to the wort of fermented beverage.

The invention further relates to an apparatus for the preparation of a fermented beverage containing a mashing unit, means for separating wort there from and for boiling said wort, and a fermentation unit, characterized in that it further comprises a vessel containing a liquid composition comprising a minimum concentration of $20.10^{-6}$ kg/L of iso-α-acids by mixing in water a natural source of α-acids and at least one metal oxide.

DESCRIPTION OF THE INVENTION

Since the cost of metal oxide is very low, the variable cost increase resulting from the process according to the invention is negligible (about 1%). During the mixing of the said metal oxide with hops added to water preferably heated at 60° C. to 110° C., the α-acids undergo preisomerisation producing a metal salt of iso-α-acids that remains mainly insoluble in the medium with a pH between 7 and 9, and preferably around 8. However, when the mixture is added to the wort, the wort pH of about 5 converts the metal salt of iso-α-acids into the acid form.

The conversion yield of the process according to the invention (from α-acids, to preisomerised α-acids and further to iso-α-acids) is comprised between 50% and 70% in wort and generally about 45% in finished beer instead of 30% to 35% in finished beer for conventional conversion (without pre-isomerization intermediary), thereby resulting in a reduction of hop consumption of about of 30%.

The process according to the invention, while keeping the advantages of using hops, allows a significant reduction of the required amount of hops, which is money saving. Moreover, the process according to the invention can also be performed on non-preisomerized hop pellets, which have been previously stored in the brewery for up to two years. The source of α-acids used for the invention is thus a natural and non-extracted form of α-acids. This allows for more flexibility for the brewery in terms of hop sourcing and brand depended usage of the process.

Moreover, the process according to the invention can be carried out in the existing plants, thus in situ, since generally hops is added to water in a tank, mixed before being added to the wort or fermentation kettle.

Therefore, the invention provides a very simple and easy process for economically bittering the fermented beverage with about 30% less hops than traditionally required and much more economical than the alternative processes proposed in the prior art and discussed above. Furthermore, the process can be carried out in breweries with little or no change to the existing production line.

Advantageously the metal oxide is chosen in the group consisting of alkaline earth metal oxide or ferrous metal oxide and is preferably MgO.

Further, food grade MgO can be left in the fermented beverage. Indeed, for example, in the case of beer, beer already contains $Mg^{2+}$ and the additional amount does not need to be removed.

In a preferred embodiment, the mixing time of the metal oxide with hops is comprised between 5 and 60 minutes and is preferably 20 minutes. The optimal time period of 20 minutes allows the best compromise between component degradation and preisomerisation yield. It was indeed surprisingly found that such a short period of time is sufficient to allow a great preisomerisation yield.

It was found that a process time longer than 25 minutes does not further increase the isomerisation yield when using the optimal process conditions with respect to MgO dosing and water temperature.

Preferably, the mixture is performed in water at a temperature between 60 and 110° C., preferably between 70° C. and 95° C. More preferably, said heated water presents a temperature of 80° C. This is a temperature that reaches the best yield to energy consumption ratio. Furthermore, water at 80° C. is usually constantly produced in a brewery as it is used for many other brewing processes stages. Moreover, since the heated water containing hops mixed with at least one metal oxide, preferably MgO, will be added to the wort boiling kettle, the heating of the water does not waste energy since this step pre-heats hops to be added during boiling step.

Particularly, the metal oxide is added to the mixture in an amount comprised between 0.05 kg to 0.8 kg of metal oxide per kg of α-acids, preferably between 0.1 kg and 0.3 kg metal oxide per kg of α-acids and more preferably about 0.2 kg metal oxide per kg of α-acids. The amount of 0.2 kg metal oxide per kg of α-acids is optimal with respect to the balance yield/cost.

Indeed, higher amounts of metal oxide will leave some metal oxide unreacted and hence this will lead to a pH increase that can cause further degradation of beer. On the other hand, lower amounts reduce the yield.

The fermented beverage can be produced in an apparatus according the invention, said apparatus containing a mashing unit, means for separating wort there from and for boiling it, and a fermentation unit, the apparatus further comprising a separate vessel for obtaining the liquid composition with a minimum concentration of $20.10^{-6}$ kg/L of iso-α-acids by mixing in water a natural source of α-acids and at least one metal oxide. In said separate vessel, the liquid composition is prepared in situ. The liquid composition can be added prior to the wort or to the fermented beverage.

Other characteristics and advantages of the invention will appear more clearly in the light of the following non-limiting examples.

EXAMPLES

In the following examples, different processes for brewing a beer with a bitterness of $20.10^{-6}$ kg/L of iso-α-acids are described. Example 1 describes a conventional process where hop is directly added to the wort boiling kettle. Example 2 describes the process according to the invention while example 3 discloses the same process using commercially available pre-isomerised hops. The calculations for the hop dosing are based on following assumptions:
  Overall hop yield (=iso-α-acids in finished beer/α-acids added to wort):
    Conventional process (non-pre-isomerised hops)=32%
    Process according to the invention at least 40%
    Commercially available pre-isomerised hops=45%
  The brew volume is assumed to a 100 hL at the cold wort stage after filtering of the mash.
  We assume no dilution in the production process subsequent to the cold wort stage.

Example 1

The hops are added to the wort at the beginning of the boiling process. In this case the conversion of α-acids to iso-α-acids happens gradually during the course of the boiling process. After boiling, wort clarification and wort cooling (cold wort stage), the conversion yield is about 40%. However some of the iso-α-acids are lost again during the subsequent fermentation and filtration processes. In this way, a final hop yield of about 32% is obtained in finished beer with this process.

To calculate the amount of hops required for a bitterness level of $20.10^{-6}$ kg/L of iso-α-acids in finished beer, the overall hop yield and brew volume are taken into account. In these conditions, it is required to add at the beginning of boiling 0.625 kg of α-acids ((bitterness level/hop yield)* brew volume=$(20.10^{-6}$ kg/L/32%)*10000 L).

$$kg \frac{\text{bitterness level}}{\text{hop yield}} * \text{brew volume} = \frac{20.10^{-6} \text{ kg/L}}{32\%} * 10000 \text{ L} = 0{,}625$$

These α-acids can be added in the form of different hop products to the boiling wort:
  Whole hops: level of α-acids in whole hops varies from 2-10% depending on hop variety.
  Hop pellets (Type 90 or Type 45 for example, commercially available from S.S. Steiner Inc.): level of α-acids varies from 5-20% depending on hop variety.
  Hop extract ($CO_2$-extract): level of α-acids is usually around 30% (for example, commercially available from S.S. Steiner Inc.)
  In this example Type 90 hop pellets are used containing 10% of α-acids, hence it is required to add in total 6.25 kg of pellets to the wort. These pellets can first be mixed shortly with water or added in the dry form to the boiling wort.

Example 2

A hops/water mixture prepared according to the invention has been added to the boiling wort or to the hot wort (during wort clarification after the boiling phase). The timing is of less importance, as the actual conversion of α-acids to iso-α-acids does not take place in the wort, but during the preparation process of the bitterness hop composition, which takes place in the brewery in a separate tank just before the addition of the hops to the wort or to the fermented beverage. For the process according to the invention non-preisomerised hop products are used. This is a natural, non-extracted source of α-acids. These can be whole hops or hop pellets.

To the hops, water at 80° C. is added in an amount that dilutes the α-acids to a level 1% w/v. Furthermore, MgO is added in a concentration of 0.2 kg of MgO/kg of α-acids. The mixture is then mixed for 20 minutes in a separate tank and afterwards directly added to the wort. With this process an isomerisation yield of about 60-70% is obtained in the cold wort. Some of the iso-α-acids are lost again during subsequent fermentation and filtration processes. A final hop yield of at least 40% is obtained in finished beer with the process.

To calculate the amount of hops required for a bitterness level of 20 ppm iso-α-acids in finished beer, the overall hop yield and brew volume must be taken into account. In these conditions, it is required to start with 0.4444 kg of α-acids ((bitterness level/hop yield)*brew volume=$(20.10^{-6}$ kg/L/ 45%)*10000 L) in the process according to the invention. Different hop products can be used as a natural source of α-acids in the process according to the invention:
  Whole hops
  Hop pellets
  For clarity's sake it to be understood that for the present invention, hop extracts are not to be considered as a natural source of α-acids. In this example Type 90 hop pellets are used containing 10% of α-acids, hence it is required to start with in total 4.44 kg of hops. These hop pellets are mixed with water at 80° C. to a total volume of 44 L and MgO in an amount of 0.0888 kg. The hop/water/MgO mixture is mixed for duration of 20 min. After this period the mixture is added directly to the wort.

Example 3

When using pre-isomerised hop products, the hops are added to the boiling wort or to the hot wort (during wort clarification after the boiling phase). The timing is of less importance, as the actual conversion of α-acids to iso-α-acids does not take place in the wort, but is done by the supplier in a pre-isomerisation process. With this process, the conversion in the hop product is almost complete, resulting in hop products containing almost no α-acids and only iso-α-acids. Using pre-isomerised hops, a yield of about 60-70% is reached in the cold wort. Some of the iso-α-acids are lost again during subsequent fermentation and filtration processes. A final hop yield of at least 40% is obtained in finished beer with the process.

To calculate the amount of hops required for a bitterness level of 20 ppm iso-α-acids in finished beer, the overall hop yield and brew volume are taken into account. In these conditions, it is required to add at the beginning of boiling 0.4444 kg of iso-α-acids ((bitterness level/hop yield)*brew volume=(20.10$^{-6}$ kg/L/45%)*10000 L). These α-acids can be added in the form of different hop products to the wort:

Pre-isomerised hop pellets (PIP): Level of iso-α-acids varies from 5-20% depending on hop variety Pre-isomerised kettle extract (PIKE or IKE): Level of iso-α-acids is usually around 30%

In this example pre-isomerised hop pellets are used containing 10% of iso-alpha-acids, hence it is required to add in total 4.44 kg of pellets to the wort. These pellets are first mixed shortly with water or added in the dry form to the boiling wort.

As it can be seen from the aforementioned examples, with respect to a conventional process using 6.25 kg of hops pellets for a brew volume of 100 hL, the process according to the invention allows to use 4.44 kg for the same result, i.e. a reduction of 28.96% w/w. The preisomerised hops pellets that are commercially available allow the same result but since pre-isomerised hop pellets are 20% more expensive, the use of such preisomerised hop pellets is clearly not so economically interesting since the use of MgO only increases the process costs of 1%.

Example 4

Example 4 demonstrates that, in accordance with the process of the present invention, final hop yields in beer can be achieved from 40% up to more than 60%. For the brewing of a specific beer, hops are dosed at a rate of 3.2 g α-acids/hectoliter. The hops are processed in accordance with the present invention by mixing the hops in water at 85° for 20 minutes with the addition of 0.2 g MgO/g α-acids to obtain a liquid composition that is dosed to the wort. Measurements revealed that the bitterness level of the beer obtained from the hopped wort is 19.9 mg iso-α-acids/l beer. The resulting hop yield of the process is therefore:

$$\frac{\text{mg/l iso } \alpha\text{-acids measured in beer}}{\text{mg/}\alpha\text{-acids dosed in wort}} = \frac{19.9 \text{ mg/l}}{32 \text{ mg/l}} = 62\%$$

The invention claimed is:

1. A process for preparing a fermented beverage comprising the following steps:
   (a) producing a mash;
   (b) filtering said mash and recovering the wort;
   (c) boiling said wort; and
   (d) fermenting said wort to produce a fermented beverage,
   preparing in situ, prior to the addition to the wort or fermented beverage, a liquid composition having a minimum concentration of 20.10$^{-6}$ kg/L of iso-α-acids by mixing in at least one metal oxide with a natural, non-extracted, source of α-acids for a period of between 5 and 60 minutes, and
   adding said liquid composition comprising iso-α-acids to said wort or to said fermented beverage.

2. The process as identified in claim 1 wherein said liquid composition is prepared in situ prior to its addition to said wort or to said fermented beverage.

3. The process according to claim 1, wherein said metal oxide is chosen in the group consisting of alkaline earth metal oxide or ferrous metal oxide.

4. The process according to claim 3, wherein said metal oxide is MgO.

5. The process for brewing a fermented beverage according to claim 1, characterized in that the final conversion yield after brewing of α-acids into iso-α-acids is at least 40%.

6. The process according to claim 1, wherein the mixing period is 20 minutes.

7. The process according to claim 1, wherein the mixing period is less than 25 minutes.

* * * * *